(12) United States Patent
Rüther et al.

(10) Patent No.: US 7,172,054 B2
(45) Date of Patent: Feb. 6, 2007

(54) APPARATUS AND METHOD FOR LUBRICATING AND COOLING GEAR MECHANISMS

(75) Inventors: Thomas Rüther, Isenbüttel (DE); Martin Wilken, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 11/252,342

(22) Filed: Oct. 17, 2005

(65) Prior Publication Data

US 2006/0076193 A1 Apr. 13, 2006

Related U.S. Application Data

(63) Continuation of application No. PCT/EP04/003384, filed on Mar. 31, 2004.

(30) Foreign Application Priority Data

Apr. 17, 2003 (DE) ................. 103 18 070

(51) Int. Cl.
  *F01M 1/00* (2006.01)
(52) U.S. Cl. ............. 184/6.26; 184/6.12; 184/26
(58) Field of Classification Search .......... 184/6.26, 184/6.12, 26
  See application file for complete search history.

(56) References Cited

U.S. PATENT DOCUMENTS

| 1,502,083 | A |   | 7/1924 | Zoelly |   |
|---|---|---|---|---|---|
| 3,738,452 | A |   | 6/1973 | Hausinger |   |
| 4,114,571 | A |   | 9/1978 | Ruf |   |
| 4,204,487 | A |   | 5/1980 | Jones |   |
| 4,284,174 | A | * | 8/1981 | Salvana et al. | ............ 184/6.4 |
| 5,099,715 | A |   | 3/1992 | Baiker |   |
| 5,474,041 | A | * | 12/1995 | Free et al. | ............ 123/196 CP |
| 6,550,547 | B1 | * | 4/2003 | Payne et al. | .............. 175/24 |
| 6,557,651 | B1 | * | 5/2003 | Norby et al. | .............. 175/52 |
| 2002/0053489 | A1 |   | 5/2002 | Schnitzer |   |
| 2002/0195296 | A1 |   | 12/2002 | Maret et al. |   |
| 2006/0076193 | A1 | * | 4/2006 | Ruther et al. | ............. 184/6.12 |

FOREIGN PATENT DOCUMENTS

| CH | 381930 | 9/1964 |
|---|---|---|
| DE | 316376 | 11/1919 |
| DE | 369548 | 2/1923 |
| DE | 731 447 | 2/1943 |
| DE | 2 256 464 | 4/1974 |
| DE | 31 20 394 A1 | 4/1982 |

(Continued)

*Primary Examiner*—David M. Fenstermacher

(57) ABSTRACT

A device for lubricating and cooling gear mechanisms has a supply line for supplying lubricating and coolant oil from an oil sump into a first channel in a spray pipe. The first spray channel connects to at least one first nozzle for the targeted spraying of the lubricating and coolant oil into areas of the gear that require extensive lubrication and that are allocated to the first channel. The supply line is connected to a second channel and one or more second nozzles connected to the latter for spraying the oil in areas that require extensive lubrication and are allocated to the second channel. The channels are prioritized with regard to more or less critical regions of the gear mechanism. A control valve that is responsive to a back-pressure in the spray pipe actuates the channels to supply the gear mechanism in accordance with the prioritization of the regions.

13 Claims, 2 Drawing Sheets

FOREIGN PATENT DOCUMENTS

| | | |
|---|---|---|
| DE | 199 12 328 A1 | 9/2000 |
| DE | 100 33 085 A1 | 1/2002 |
| EP | 0 644 359 A1 | 3/1995 |
| GB | 1 440 769 | 6/1976 |
| GB | 2 153 018 A | 8/1985 |
| WO | 2004/092639 A3 | 10/2004 |

* cited by examiner

APPARATUS AND METHOD FOR LUBRICATING AND COOLING GEAR MECHANISMS

CROSS-REFERENCE TO RELATED APPLICATION

This is a continuing application, under 35 U.S.C. § 120, of copending international application PCT/EP2004/003384, filed Mar. 31, 2004, which designated the United States; this application also claims the priority, under 35 U.S.C. § 119, of German patent application No. 103 18 070.2, filed Apr. 17, 2003; the prior applications are herewith incorporated by reference in their entirety.

BACKGROUND OF THE INVENTION

Field of the Invention

The invention relates to an apparatus for lubricating and cooling gear mechanisms, such as gear transmissions. The lubricating apparatus has a feed line for feeding lubricating and cooling oil out of an oil sump into a first channel which is connected to the feed line, is arranged in a spray tube and is connected to at least one first nozzle for targeted spraying of the lubricating and cooling oil into lubrication-intensive regions of the gear mechanism that are assigned to the first channel.

Furthermore, the invention relates to a method for lubricating and cooling gear mechanisms, wherein lubricating and cooling oil is removed from an oil sump via a pump, is fed via a feed line to a first channel of a spray tube and is sprayed in a targeted manner, via at least one first nozzle connected to the first channel, into lubrication-intensive regions of the gear mechanism that are assigned to the first channel.

Whenever a selected gear of a motor vehicle transmission is operated under load, it requires oil. The higher the load, the more oil is required. In addition, more and more oil is centrifuged off on account of centrifugal forces, which rise as the rotational speed increases, with the result that a supply deficit of lubricating or cooling oil can occur in the tooth engagement of a gear wheel pairing of two shafts that are connected to one another via the gear wheels. Lubrication by dipping at least one gear wheel of a gear wheel pairing in engagement with one another into an oil sump is then no longer sufficient.

German patent DE 31 20 394 C2 describes an apparatus for lubricating and cooling gear mechanisms, wherein oil is pumped out of an oil sump by a pump via a feed line and is fed to a channel of a spray tube. The spray tube has various nozzles, via which the oil is sprayed into the tooth engagements of gear wheel pairings.

It is a disadvantage in that prior art apparatus that critical gear wheel pairings are also lubricated and cooled only insufficiently in critical driving situations wherein sufficient oil is not available for spraying all the gear wheel pairings.

Furthermore, Swiss patent document CH 38 19 30 describes a lubricating apparatus for gear mechanisms, which lubricating apparatus has spray nozzles on a spray tube which are configured and arranged in such a way that the lubricating oil comes into contact with the tooth flanks of the gear wheel pairings perpendicularly in a closed, fan-shaped film. That apparatus also has the above-described disadvantages.

German published patent application DE 199 12 328 A1 describes an apparatus for guiding oil in a gear mechanism of a motor vehicle, wherein gear wheel pairings are in engagement and circulate without load or are in loadbearing engagement depending on a selected gear. A spray tube having a channel has openings, via which oil can be sprayed onto the gear wheel pairings. A closure device in the form of a sliding sleeve releases for spraying in each case one opening which is assigned to a gear wheel hole. Here, the closure device can be controlled as a function of the selected gear, with the result that at least that opening whose associated gear wheel pairing is in loadbearing engagement is open. Here, the closure device is configured as a sliding sleeve which optionally covers or releases defined nozzle openings which are connected to the oil channel or the oil line.

In that apparatus, it is possible only with great difficulty and high expenditure to spray various lubrication-intensive regions of the gear mechanism with different dependencies in a targeted manner. That publication also does not disclose variable lubrication, for example according to the available oil amount.

SUMMARY OF THE INVENTION

It is accordingly an object of the invention to provide an apparatus and a method for lubricating and cooling a gear wheel mechanism which overcomes the above-mentioned disadvantages of the heretofore-known devices and methods of this general type and which improves the prior art apparatuses in such a way that targeted sprays of lubricating and cooling oil can be sprayed into various lubrication-intensive regions of the gear mechanism with different dependencies. It is an additional object to provide the foregoing with relatively simple means and inexpensively.

With the foregoing and other objects in view there is provided, in accordance with the invention, an apparatus for lubricating and cooling a gear mechanism, comprising:

a feed line for feeding lubricating and cooling oil from an oil sump;

a spray tube having a first channel formed therein communicating with said feed line;

at least one first nozzle communicating with said first channel for targeted spraying of the lubricating and cooling oil into lubrication-intensive regions of the gear mechanism associated with said first channel;

said spray tube having at least one second channel formed therein communicating with said feed line;

at least one second nozzle communicating with said second channel for targeted spraying of the lubricating and cooling oil into lubrication-intensive regions of the gear mechanism associated with said second channel; and a control valve for selectively switching said first and second channels by back-pressure acting thereupon in a first valve position, wherein said first channel is active and said second channel is closed, and a second valve position, wherein said first channel is active and said second channel is active.

In other words, the objects of the invention are achieved in that the feed line is connected to at least one second channel and at least one second nozzle which is connected to the second channel for targeted spraying into lubrication-intensive regions which are assigned to the second channel, and by the fact that a control valve is provided, via which the channels can be switched in dependence on a back-pressure in the spray tube.

By virtue of the fact that, in addition to the first channel which is arranged in the spray tube, there is also a second channel likewise having at least one nozzle, the nozzles of the first channel and the nozzles of the second channel can be switched via the control valve provided relatively simply and inexpensively according to corresponding dependencies. In addition, the apparatus according to the invention has the advantage of a small compact installation space requirement.

According to one preferred embodiment of the invention, the lubrication-intensive regions which are assigned to the channels have an at least partially different priority. Here, nozzles for spraying into regions of a higher-order first priority are assigned to the first channel and nozzles for spraying into regions of a lower-order second priority are assigned to the second channel. Here, the control valve can be switched as a function of the feed volumetric flow of the feed line or as a function of the back pressure which acts on the control valve.

As a result of the fact that nozzles of different priority are supplied by different channels, these nozzles can be switched independently of one another. By switching the control valve as a function of the feed volume or of the back pressure, it is possible to close the nozzles of a lower-order second priority in the event of an underprovision of oil in critical driving situations. Critical gears can thus already be provided earlier with more oil via the first channel. Therefore, the system can react to both underprovision as a consequence of increasing rotational speeds and extremely low rotational speeds with only a slight excess pressure, for example in full throttle operations from low gears.

According to a further embodiment of the invention, a pressure-limiting valve is provided which, when a predefined limit pressure is exceeded, opens a bypass for releasing excess lubricating and cooling oil into the oil sump. As long as the control valve is additionally configured as a pressure-limiting valve, an additional valve can be dispensed with.

According to a further preferred embodiment of the invention, the nozzles are connected to the spray tube in a pluggable manner. As a result, it is readily possible to adapt the apparatuses to different gear mechanisms by using different nozzles, for example tubular nozzles, round nozzles which spray in a round or conical shape, or by fan-type nozzles which spray in the shape of a fan. As a result of the nozzles being configured as elongate and shaped nozzles, it is possible in a relatively simple manner to guide lubricating and cooling oil even to lubrication-intensive regions of the gear mechanism which are difficult to access. In contrast, the relatively short fan-type nozzles are well suited, for example, to lubricating sliding sleeves.

The use of the apparatus according to the invention in a dual clutch transmission is particularly suitable and advantageous. In a dual clutch transmission, the drive shaft which lies relatively high and far away from the oil sump and has lubrication-intensive regions, in particular, can be lubricated and cooled without problems.

The prior art methods are also subject to the above-mentioned disadvantages.

It is therefore a further object of the invention to improve the known methods in such a way that different lubrication-intensive regions of the gear mechanism can be supplied with lubricating and cooling oil relatively inexpensively and simply, independently of one another and as a function of defined boundary conditions.

With the above and other objects in view there is also provided, in accordance with the invention, a method of lubricating and cooling a gear mechanism, the method which comprises:

feeding lubricating and cooling oil from an oil sump via a feed line to a first channel of a spray tube;

spraying the lubricating and cooling oil in a targeted manner, through at least one first nozzle connected to the first channel, into first lubrication-intensive regions of the gear mechanism assigned to the first channel;

feeding lubricating and cooling oil to at least one second channel via the feed line;

spraying the lubricating and cooling oil in a targeted manner, through at least one second nozzle connected to the second channel, into second lubrication-intensive regions of the gear mechanism assigned to the second channel; and switching a control valve communicating with the first and second channels by way of a back-pressure acting thereon into a first valve position, wherein the first channel is connected to the feed line while the second channel is closed, and into a second valve position, wherein the second channel is connected in addition to the first channel.

In other words, the objects are achieved by the fact that lubricating and cooling oil is fed to at least one second channel via the feed line and is sprayed in a targeted manner, via at least one second nozzle, into lubrication-intensive regions which are assigned to the second channel, and by the fact that the channels are switched via a control valve that is acted upon by the oil backpressure.

As a result of the fact that oil is fed via two channels whose nozzles are assigned to different lubrication-intensive regions, the different regions can be switched via the control valve as a function of defined parameters. Varied, for example two-stage, lubrication is made possible as a result.

According to one preferred embodiment of the invention, lubricating and cooling oil is sprayed into lubrication-intensive regions of a higher-order first priority via the first channel in conjunction with the nozzles which are assigned to the latter, and lubricating and cooling oil is sprayed into lubrication-intensive regions of a lower-order second priority via the second channel in conjunction with the nozzles which are assigned to the latter. Here, the regions of a first priority are assigned to tooth engagements of gear wheel pairings for critical gears, the control valve opening only the first channel in critical driving situations as a function of the volumetric flow and/or of the back pressure in the feed line or the spray tube.

In driving situations wherein the volumetric flow of oil or the back pressure drops and the amount of oil is not sufficient to supply all toothing systems with oil in an optimum manner, the second channel is closed by the falling back pressure, with the result that only the lubrication-intensive regions of a first priority are supplied with oil via the first channel, that is to say gear wheel pairings with critical gears. The remaining gears are not, or only scarcely, supplied with oil. If the feed volumetric flow is increased and the back pressure rises, the second channel is opened again in addition to the first channel.

When a defined back pressure is exceeded, a bypass is additionally opened, with the result that excess oil is released into the oil sump. Oil or lubricating and cooling oil is understood to mean all suitable fluids which are known to the person skilled in the art for the lubrication and cooling of gear mechanisms.

Other features which are considered as characteristic for the invention are set forth in the appended claims.

Although the invention is illustrated and described herein as embodied in a apparatus and method for lubricating and cooling gear mechanisms, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1), with gear wheel pairs indicated with dashed lines.

DESCRIPTION OF THE PREFERRED EMBODIMENTS

Figure 1:
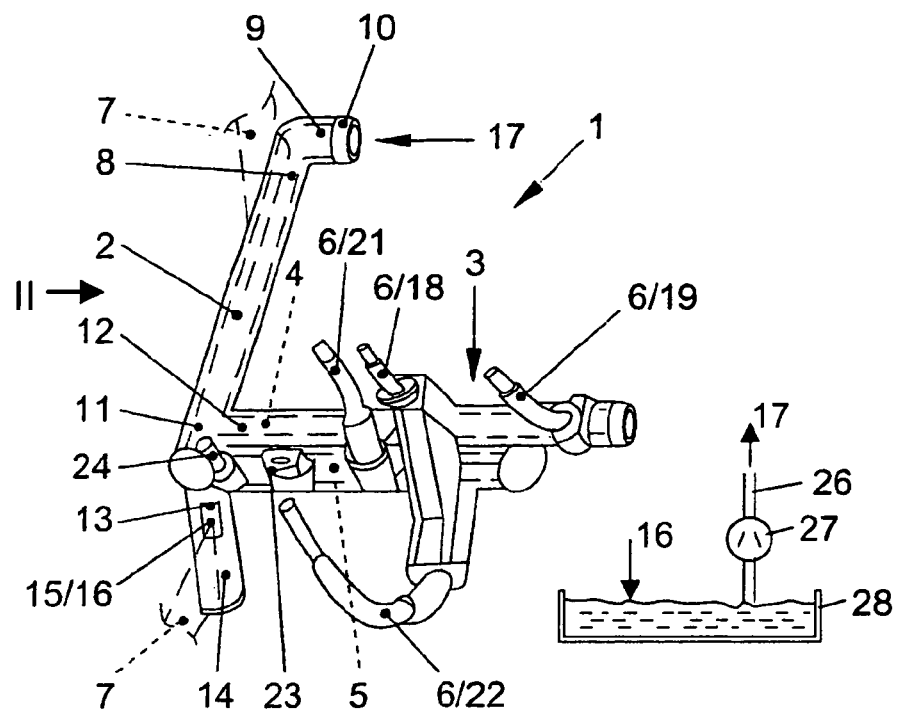
FIG. 1 is a front perspective view of an apparatus for lubricating and cooling a dual clutch transmission.
Figure 2:
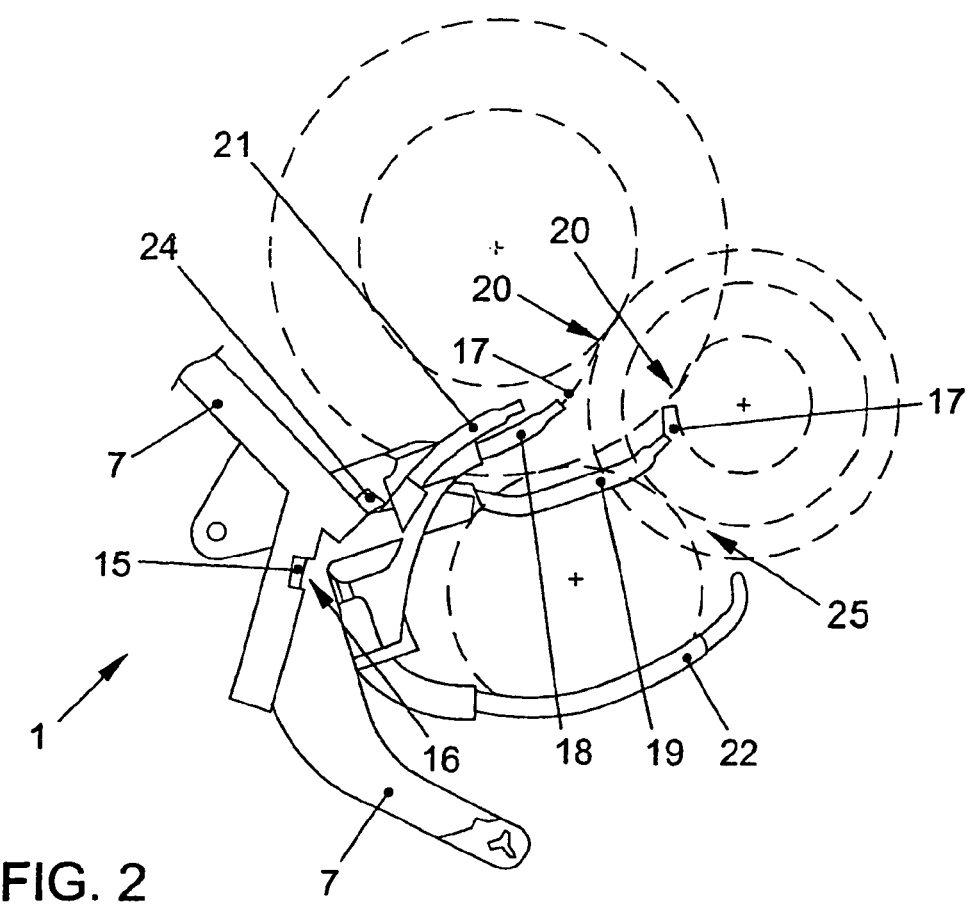
FIG. 2 shows a side view of an apparatus for lubricating and cooling a dual clutch transmission, viewed in direction II (cf.

Referring now to the figures of the drawing in detail and first, particularly, to FIG. 1 thereof, there is shown an apparatus 1 for lubricating and cooling a gear mechanism that substantially comprises a feed line 2, and a spray tube 3 with a first channel 4, a second channel 5, and nozzles 6.

Figures 3A, 3B:
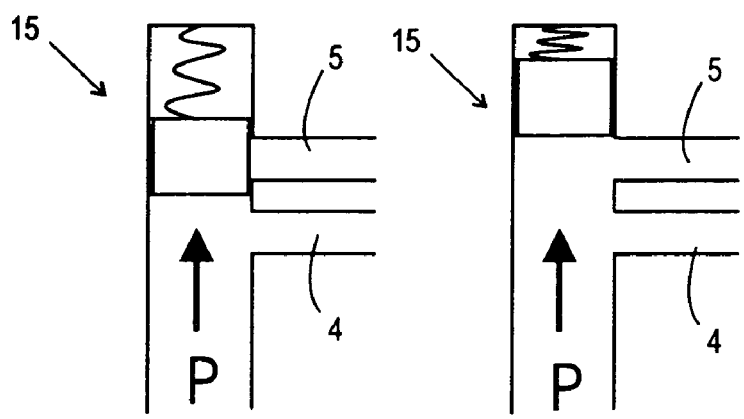
FIGS. 3A and 3B are enlarged, fragmentary, side-elevational views illustrating valve positions of a control valve.

The feed line 2 is configured as a tube with integrally molded retaining or fastening elements 7. At its first end 8, the feed line 2 has an inlet 9, to which a pump line 26 can be connected. The pump line 26 has a pump 27 for conveying lubricating and cooling oil 17 out of an oil sump 28 of the gear mechanism. The term "oil" used herein refers to any lubricating and cooling fluid that is suitable for the purpose. The inlet 9 has a seal 10 for sealing off with respect to a corresponding connecting socket of a housing wall of the gear mechanism. At its second end 11 which faces away from the first end 8, the feed line 2 is connected firstly to a first end 12 of the spray tube 3 and secondly to a first valve tube end 13 of a valve tube 14. A spring-loaded control valve 15, which is best seen in FIGS. 3A and 3B, is arranged in the valve tube 14 in such a way that it opens the first channel 4 and closes the second channel 5 in a first valve position shown in FIG. 3A. The second channel 5 is opened in addition to the first channel 4 in a second valve position shown in FIG. 3B. Finally, a bypass 16 is opened in addition to the first and second channels 4, 5 in a third valve position. The bypass 16 allows excess lubricating and cooling oil 17 to be released into the oil sump 28 of the gear mechanism. As a result, the control valve 15 acts at the same time as a pressure-limiting valve. The control valve 15 is switched by the back pressure which acts on it from the lubricating and cooling oil 17 flowing in the feed line 2.

In the exemplary embodiment, the nozzles 6 which are configured as tubular nozzles 18, 19 are connected to the first channel 4 and spray lubricating and cooling oil 17 into lubrication-intensive regions of a higher-order first priority 20. The tubular nozzles 18, 19 are directed at the tooth engagement region of gear wheel pairings for critical gears of a first priority. The tubular nozzles 21, 22, the nozzle 6 which is configured as a fan-type nozzle 23 and the nozzle 6 which is configured as a round nozzle 24 are connected to the second channel 5 and spray lubricating and cooling oil 17 into lubrication-intensive regions of a lower-order second priority 25. The tubular nozzles 21, 22 are directed at the tooth engagement region of gear wheel pairings for gears of a second priority. The fan-type nozzle 23 and the round nozzle 24 are directed at lubrication-intensive regions of a second priority, such as at sliding sleeves.

In order to supply lubricating and cooling oil 17 to the lubrication-intensive regions of the gear wheels or their tooth engagements, the pressurized oil present is guided via the inlet 9 into the feed line 2 and further into the spray tube 3, where it emerges again at the nozzles 6 and is sprayed into the lubrication-intensive regions 20, 25. As the volumetric flow of oil is influenced by other functions of the gear mechanism, it varies in a pronounced manner. Driving situations therefore occur wherein the amount of oil is not sufficient to supply all the lubrication-intensive regions 20, 25 with lubricating and cooling oil 17 in an optimum manner. Some critical gears and lubrication-intensive regions of a first priority 20 are affected by this in certain driving conditions. Said lubrication-intensive regions of a first priority 20 are fed via the first channel 4. The remaining gears and lubrication-intensive regions of a second priority 25 are supplied via the second channel 5. At low volumetric flows, only the first channel 4 is opened via the control valve 15, which first channel 4 sprays the small amount of lubricating and cooling oil 17 in a targeted manner into the lubrication-intensive regions of a first priority 20. The remaining gears and lubrication-intensive regions of a second priority 25 are not, or scarcely, supplied with oil. If the feed volumetric flow increases, the back pressure in the feed line increases, and the control valve 15 opens the second channel 5, via which the lubrication-intensive regions of a second priority 25 are supplied. When a predefined back pressure is exceeded, the control valve 15 opens the bypass 16, via which the excess lubricating and cooling oil 17 is released into the oil sump.

We claim:

1. An apparatus for lubricating and cooling a gear mechanism, comprising:
    a feed line for feeding lubricating and cooling oil from an oil sump;
    a spray tube having a first channel formed therein communicating with said feed line;
    at least one first nozzle communicating with said first channel for targeted spraying of the lubricating and cooling oil into lubrication-intensive regions of the gear mechanism associated with said first channel;
    said spray tube having at least one second channel formed therein communicating with said feed line;
    at least one second nozzle communicating with said second channel for targeted spraying of the lubricating and cooling oil into lubrication-intensive regions of the gear mechanism associated with said second channel; and
    a control valve for selectively switching said first and second channels by back-pressure acting thereupon in a first valve position, wherein said first channel is active and said second channel is closed, and a second valve position, wherein said first channel is active and said second channel is active.

2. The apparatus according to claim 1, wherein the lubrication-intensive regions assigned to said first and second channels are assigned mutually different priorities including a higher-order first priority and a lower-order second priority, and wherein said nozzles for spraying into regions of said higher-order first priority communicate with said first channel and said nozzles for spraying into regions of said lower-order second priority communicate with said second channel.

3. The apparatus according to claim 1, which comprises a bypass communicating with the oil sump, and a pressure-limiting valve configured to open said bypass when a predefined threshold pressure is exceeded, for releasing excess lubricating and cooling oil into the oil sump.

4. The apparatus according to claim 3, wherein said control valve is additionally configured as a pressure-limiting valve.

5. The apparatus according to claim 1, wherein said nozzles are connected to said spray tube through a plug-in connection.

6. The apparatus according to claim 1, wherein at least one of said nozzles is a tubular nozzle extending to the lubrication-intensive region.

7. The apparatus according to claim 1, wherein at least one of said nozzles is a round nozzle configured to spray in a round or conical shape.

8. The apparatus according to claim 1, wherein at least one of said nozzles is a fan-type nozzle configured to spray in a shape of a fan.

9. The apparatus according to claim 1, wherein the lubrication-intensive regions included a tooth engagement of defined gearwheel pairs of adjacent shafts.

10. The apparatus according to claim 1, disposed to lubricate and cool a dual clutch transmission.

11. A method of lubricating and cooling a gear mechanism, the method which comprises:

feeding lubricating and cooling oil from an oil sump via a feed line to a first channel of a spray tube;

spraying the lubricating and cooling oil in a targeted manner, through at least one first nozzle connected to the first channel, into first lubrication-intensive regions of the gear mechanism assigned to the first channel;

feeding lubricating and cooling oil to at least one second channel via the feed line;

spraying the lubricating and cooling oil in a targeted manner, through at least one second nozzle connected to the second channel, into second lubrication-intensive regions of the gear mechanism assigned to the second channel; and switching a control valve communicating with the first and second channels by way of a back-pressure acting thereon into a first valve position, wherein the first channel is connected to the feed line while the second channel is closed, and into a second valve position, wherein the second channel is connected in addition to the first channel.

12. The method according to claim 11, which comprises:

defining tooth engagements of gear wheel pairings for critical gears of the gear mechanism as lubrication-intensive regions of a higher-order first priority;

spraying the lubricating and cooling oil into the lubrication-intensive regions of the first priority via the first channel and through the nozzles assigned thereto;

spraying the lubricating and cooling oil into lubrication-intensive regions of a lower-order second priority via the second channel and through the nozzles assigned thereto; and opening only the first channel with the control valve during critical driving situations in dependence on a volumetric flow and/or of a back pressure in the feed line or in the spray tube.

13. The method according to claim 12, which comprises:

during critical driving situations and on occasion of low volumetric flow and/or low back pressure caused by small available amounts of oil, supplying with preference the lubrication-intensive regions of gear wheel pairings for critical gears of the first priority with lubricant and coolant by closing the second channel;

opening the second channel when the volumetric flow and/or back pressure is sufficient; and when a predefined back pressure is exceeded, opening a bypass for releasing excess lubricant and coolant into the oil sump.

* * * * *